US010032527B2

(12) United States Patent
Herderick et al.

(10) Patent No.: US 10,032,527 B2
(45) Date of Patent: Jul. 24, 2018

(54) METHOD FOR FABRICATING SILICON CARBIDE ASSEMBLIES

(71) Applicant: EDISON WELDING INSTITUTE, INC., Columbus, OH (US)

(72) Inventors: Edward D. Herderick, Powell, OH (US); Kirk E. Cooper, Worthington, OH (US); Nathan D. Ames, Sunbury, OH (US)

(73) Assignee: EDISON WELDING INSTITUTE, INC., Columbus, OH (US)

( * ) Notice: Subject to any disclaimer, the term of this patent is extended or adjusted under 35 U.S.C. 154(b) by 59 days.

(21) Appl. No.: 15/176,942

(22) Filed: Jun. 8, 2016

(65) Prior Publication Data

US 2016/0284427 A1    Sep. 29, 2016

Related U.S. Application Data

(63) Continuation of application No. 13/624,423, filed on Sep. 21, 2012.
(Continued)

(51) Int. Cl.
*B27G 11/02* (2006.01)
*B32B 37/00* (2006.01)
(Continued)

(52) U.S. Cl.
CPC .............. *G21C 3/07* (2013.01); *B23K 1/008* (2013.01); *B23K 1/0056* (2013.01); *B23K 26/20* (2013.01);
(Continued)

(58) Field of Classification Search
CPC ...... B29B 9/00; B32K 35/286; B32K 35/025; C04B 37/026; C04B 37/02;
(Continued)

(56) References Cited

U.S. PATENT DOCUMENTS

| 4,738,389 A | 4/1988 | Moshier et al. |
| 4,753,850 A | 6/1988 | Ibe et al. |

(Continued)

OTHER PUBLICATIONS

Ye, "An Overview of the Development of Al—Si-Alloy Based Material for Engine Applications", JMEPEG (2003) 12:288-297.*
(Continued)

*Primary Examiner* — Alex Efta
(74) *Attorney, Agent, or Firm* — Frost Brown Todd LLC

(57) ABSTRACT

A method for fabricating assemblies includes providing first and second components that include ceramic, metal, or composite; positioning a multiphase joining interlayer between the first and second components, wherein the joining interlayer includes a first phase that melts at a first temperature and a second phase interspersed throughout the first phase, and wherein the second phase melts at a second temperature that is lower than the melting temperature of the first phase; and heating the joining interlayer to a temperature in the range of 725° C. to 1450° C. for a predetermined period of time to soften the first phase and melt the second phase, wherein the first phase remains in a solid or a semi-solid state, and wherein the second phase segregates to the boundaries of the first phase and transforms the joining interlayer into a substantially porosity-free adherent material that joins the first component to the second component.

11 Claims, 2 Drawing Sheets

Related U.S. Application Data

(60) Provisional application No. 61/538,409, filed on Sep. 23, 2011.

(51) Int. Cl.

| | | |
|---|---|---|
| *C04B 33/34* | (2006.01) | |
| *G21C 3/07* | (2006.01) | |
| *B32B 37/06* | (2006.01) | |
| *B23K 37/00* | (2006.01) | |
| *B23K 26/20* | (2014.01) | |
| *B23K 1/005* | (2006.01) | |
| *C04B 37/00* | (2006.01) | |
| *C04B 37/02* | (2006.01) | |
| *B23K 1/008* | (2006.01) | |
| *C04B 35/565* | (2006.01) | |
| *C22C 21/02* | (2006.01) | |

(52) U.S. Cl.
CPC .............. *B23K 37/00* (2013.01); *B32B 37/00* (2013.01); *B32B 37/06* (2013.01); *C04B 35/565* (2013.01); *C04B 37/006* (2013.01); *C04B 37/026* (2013.01); *C22C 21/02* (2013.01); *C04B 2235/3826* (2013.01); *C04B 2237/121* (2013.01); *C04B 2237/365* (2013.01); *C04B 2237/40* (2013.01); *C04B 2237/403* (2013.01); *C04B 2237/59* (2013.01); *C04B 2237/595* (2013.01); *C04B 2237/60* (2013.01); *C04B 2237/72* (2013.01); *G21Y 2004/10* (2013.01); *Y02E 30/40* (2013.01)

(58) Field of Classification Search
CPC ............ C04B 2237/12; C04B 2237/16; B32B 38/0036; B32B 2309/02
See application file for complete search history.

(56) References Cited

U.S. PATENT DOCUMENTS

| | | | |
|---|---|---|---|
| 4,784,313 A | | 11/1988 | Godziemba-Maliszewski |
| 5,476,725 A | * | 12/1995 | Papich ................ B22D 11/008 148/523 |
| 6,033,787 A | | 3/2000 | Nagase et al. |
| 6,312,535 B1 | * | 11/2001 | Leatham ................ B22F 3/115 148/400 |
| 7,270,885 B1 | * | 9/2007 | Karandikar .......... B23K 35/286 428/446 |
| 2008/0035707 A1 | * | 2/2008 | Glaeser ................ C04B 37/006 228/121 |

OTHER PUBLICATIONS

Klehn, Russell, and T. W. Eagar. "Joining of 6061 Aluminum Matrix-Ceramic Particle Reinforced Composites." WRC Bulletin (1993). http://eagar.mit.edu/Publications/Eagar135.pdf (Jan. 26, 2013).

Rohatgi, Pradeep K, "Nucleation Phenomenon During Solidification of Metal Matrix Composites", Materials Science and Engineering, A162 (1993), pp. 163-174.

PCT International Search Report, International Application No. PCT/US12/56654, dated May 29, 2013.

* cited by examiner

METHOD FOR FABRICATING SILICON CARBIDE ASSEMBLIES

CROSS-REFERENCE TO RELATED APPLICATIONS

This patent application is a continuation of U.S. patent application Ser. No. 13/624,423 filed on Sep. 21, 2012 and entitled "System for Fabricating Silicone Carbide Assemblies", which claimed the benefit of U.S. Provisional Patent Application Ser. No. 61/538,409 filed on Sep. 23, 2011 and entitled "Method for Joining Ceramic Bodies to One Another," the disclosures of which are hereby incorporated by reference herein in their entirety and made part of the present U.S. utility patent application for all purposes.

BACKGROUND OF THE INVENTION

The present invention relates generally to methods for joining structural and functional ceramic bodies to one another, and more specifically to a system and method for joining silicon carbide to itself using melting point assisted multiphase brazing so that the joined silicon carbide may be used, for example, as fuel cladding in nuclear reactors.

Ceramic materials are useful for certain demanding engineering applications due to their: (i) excellent strength at high temperature; (ii) resistance to chemical attack; (iii) inertness in radiation environments; and (iv) certain functional characteristics including optical properties, semiconductor properties and piezoelectricity. However, ceramics are not easily fabricated into complex shapes and, as a consequence, require advanced joining processes to integrate such materials into useful products. Joining silicon carbide to itself or other materials (e.g., other engineering ceramics, metals) is important for applications including manufacturing personal and vehicle armor, gas turbine engines, air breathing rocket engines, fusion reactors, and high temperature electronics. For use in the nuclear industry, various approaches have been investigated for joining silicon carbide to itself. However, these approaches have not been successful in addressing radiation damage and retaining joint integrity after irradiation.

Using silicon carbide (SiC) ceramic-matrix composites as the fuel cladding in light water reactors could lead to a very significant increase in the safety of existing reactors and transitioning from zirconium alloy nuclear fuel cladding to a silicon carbide composite cladding represents a significant shift in light water reactor materials technology. SiC is an important structural ceramic material owing to its excellent thermal and environmental stability, resistance to radiation, resistance to thermal shock, and high strength and toughness. Additionally, SiC is stable at temperatures in excess of 2,000° C. and does not melt under loss of coolant accident (LOCA) conditions. Furthermore, SiC does not suffer from fretting wear and produces very small amounts of hydrogen during oxidation in high temperature steam relative to presently used Zirconium alloys.

In addition to potentially improving safety, SiC has a lower neutron penalty than Zircaloy and may provide economic benefits if the same thickness of material is used in newly designed cladding. This may also allow for higher fuel burnups, thereby reducing the amount of nuclear fuel used by a reactor. Accordingly, SiC fuel cladding is considered to be an important strategic technology for advanced nuclear fuels programs. However, joining end plugs to cladding tubes for sealing in fuel pellets once they have been loaded into the fuel rods represents a remaining technical hurdle. This is an inherently difficult problem and acceptable technical solutions must be based on in-reactor conditions. Desired joint characteristics include mechanical robustness in commercial nuclear reactor conditions of 2250 PSI, at 350° C., in a water/steam environment, at neutron flux rate of about $1\times10^{14}$ n/cm$^2$-s (thermal+fast), for more than 6 years of service, and closure of the rod should be maintainable at temperatures of up to 1200° C.

Known technical approaches for joining SiC for use in nuclear environments include glass-ceramic bonding, displacement reaction bonding using $Ti_3SiC_2$, diffusion bonding with metallic foil inserts, and brazing using silicon containing materials. None of these approaches results in a product that can survive irradiation and flowing water tests that mimic in-service reactor conditions. Furthermore, these approaches require high pressures or extensive heating times to form mechanically sound joints, thereby making manufacturing difficult. Therefore, there is an ongoing need for a system and/or method that effectively joins silicon carbide to itself or to other materials to create assemblies for use in a variety of applications including fuel cladding in nuclear reactors.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first method for fabricating assemblies is provided. This method includes providing a first component, wherein the first component includes ceramic, metal, or composite; providing a second component, wherein the second component includes ceramic, metal, or composite; positioning a multiphase joining interlayer between the first and second components, wherein the joining interlayer includes a first phase that melts at a first temperature and a second phase interspersed throughout the first phase, and wherein the second phase melts at a second temperature that is lower than the melting temperature of the first phase; and heating the joining interlayer to a temperature in the range of 725° C. to 1450° C. for a predetermined period of time, wherein heating the joining interlayer to a temperature in the range of 725° C. to 1450° C. for a predetermined period of time softens the first phase and melts the second phase, wherein the first phase remains in a solid or a semi-solid state, and wherein the second phase segregates to the boundaries of the first phase and transforms the joining interlayer into a substantially porosity-free adherent material that joins the first component to the second component.

In accordance with another aspect of the present invention, a second method for fabricating assemblies is provided, wherein the assemblies are for use in a nuclear reactor. This method includes providing a first silicon carbide component; providing a second silicon carbide component; positioning a multiphase joining interlayer between the first and second components, wherein the joining interlayer includes a first phase that melts at a first temperature and a second phase interspersed throughout the first phase, and wherein the second phase melts at a second temperature that is lower than the melting temperature of the first phase; and heating the joining interlayer to a temperature in the range of 725° C. to 1450° C. for a predetermined period of time, wherein heating the joining interlayer to a temperature in the range of 725° C. to 1450° C. for a predetermined period of time softens the first phase and melts the second phase, wherein the first phase remains in a solid or a semi-solid state, and wherein the second phase segregates to the boundaries of the first phase and transforms the joining interlayer into a substantially porosity-free adherent material that joins the first component to the second component.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

DESCRIPTION OF THE FIGURES

The accompanying drawings, which are incorporated into and form a part of the specification, schematically illustrate one or more exemplary embodiments of the invention and, together with the description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

As previously stated, the present invention relates generally to a system and method for joining structural and functional ceramics to one another or to other materials and more specifically to a system for joining silicon carbide to itself for use as nuclear fuel cladding. SiC-based fuel cladding is currently the most promising technology for enhanced accident-tolerant nuclear fuel cladding and this system utilizes a two or more phase joining interlayer that further includes at least one phase that has a higher melting point than the second or other phases. During processing, the higher melting point phase remains in a solid or semi-solid state and is compressed due to applied pressure. The lower melting point phase or phases melt and segregate to the boundaries of the higher melting point phase. This process assists in the wetting of the higher melting point phase and bonding it to the surfaces of substrate materials, thereby resulting in the formation of a two or more phase joint microstructure that provides improved toughness for preventing crack formation during processing and service. This approach has proven to create a robust joint that is made of materials with low radiation sensitivity and that is likely to withstand radiation damage. With reference now to the Figures, one or more exemplary embodiments of this invention shall be described in greater detail.

Figure 1:
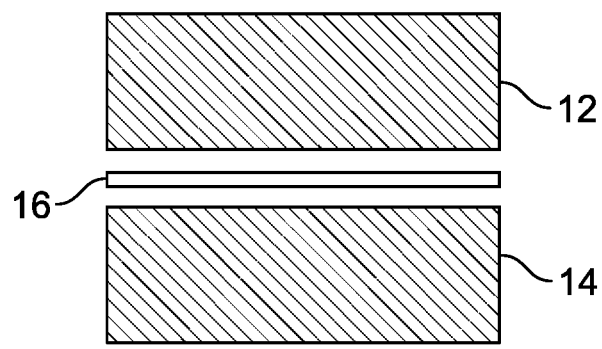
FIG. 1 is a highly simplified illustration of an exemplary embodiment of the method of the present invention wherein a ceramic body is being joined to either a ceramic body or a metallic body using a single joining interlayer.
Figure 2:
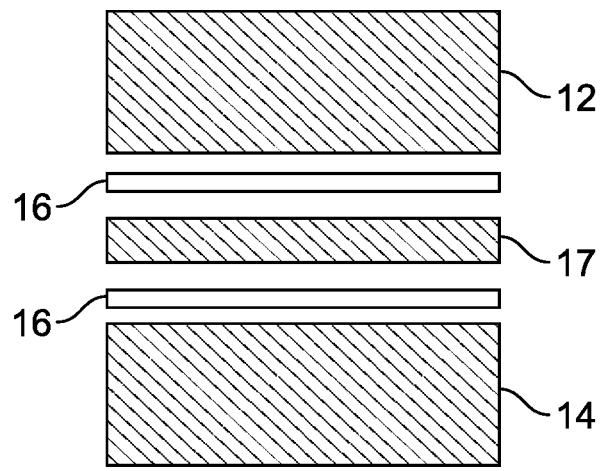
FIG. 2 is a highly simplified illustration of an exemplary embodiment of the method of the present invention wherein a ceramic body is being joined to either a ceramic body or a metallic body using a high temperature metal interlayer and two joining interlayers.
Figure 3:
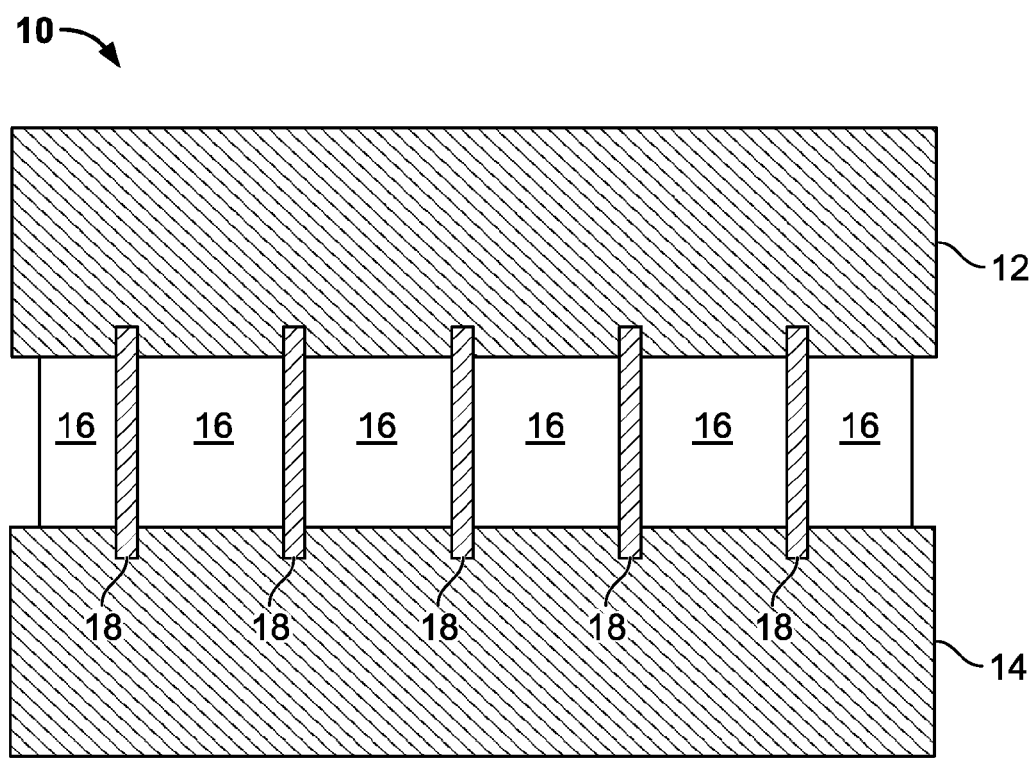
FIG. 3 is a highly simplified illustration of an exemplary silicon carbide assembly fabricated in accordance with the present invention, wherein the "ligaments" formed by the material that melts at the lower of the two melting temperature are visible in the assembly.

With reference to FIGS. 1-3, the present invention provides a system and method for fabricating silicon carbide assemblies 10 by joining ceramic bodies to one another (or to metallic bodies) using melting point-assisted multiphase brazing. This system typically includes at least two silicon carbide materials (12 and 14); at least one joining interlayer 16 positioned between the at least two silicon carbide materials, wherein the at least one joining interlayer further includes a first material that melts at a first temperature and a second material interspersed throughout the first material, and wherein the second material melts at a temperature that is lower than that of the first material; and at least one apparatus for applying energy to the joining interlayer, wherein applying energy to the joining interlayer is operative to soften the first material and melt the second material, and wherein softening the first material and melting the second material is operative to transform the joining interlayer into a substantially porosity-free adherent material capable of joining together the at least two silicon carbide materials.

In one embodiment of this invention, the joining interlayer includes primarily silicon and aluminum with small amounts of one or more alloying elements. These two-phase hypereutectic (Si>12.2 wt %) Al—Si alloys are unique due to their "divorced eutectic" microstructure that consists of pure aluminum interspersed in pure silicon which results in the unique microstructure of the final joined assembly. In this embodiment, the apparatus for applying energy to the joining interlayer may be a furnace heating source in a vacuum or partial pressure argon atmosphere or, alternately, a laser heating source. Other suitable heating sources may be used with this invention. Multiple Al—Si alloys may be processed over a range of temperatures and times using such heating sources. For example, in one embodiment, Al-80 wt % Si alloy is processed in a vacuum at about 1330° C. for about 13 minutes for joining Hexoloy® SA silicon carbide blocks (Saint-Gobain Ceramics; Niagara Falls, N.Y.) to one another (see FIG. 1). Another exemplary embodiment utilizes two lower-melting point Al-12 wt % Si alloy joining interlayers and an Al-70 wt % Si alloy higher-temperature melting interlayer. Alternately, the embodiment shown in FIG. 2 may utilize two Al-80 wt % Si alloy sheets 16 as the joining interlayers. These Al-80 wt % Si alloy sheets are placed on either side of a higher-melting temperature metal layer 17 such as titanium or zirconium or refractory metals such as molybdenum or niobium or alloys thereof and then processed in a vacuum at about 1330° C. for about 13 minutes for joining Hexoloy™ SA silicon carbide to itself. The higher-melting temperature metal interlayer in this embodiment would not typically melt during the processing, but would provide strain tolerance where joined ceramic bodies might swell or expand at rates different than the joining interlayer.

In general, the present invention can be used to join silicon carbide to itself using applied temperatures of between 725° C. and 1450° C. The lower melting temperature aluminum melts at boundaries between non-melted silicon areas and may assist in diffusion bonding under low applied loads of several pounds. Other materials combinations including silicide compounds such as niobium silicide or titanium silicide may be used as the higher melting temperature phase. Another exemplary embodiment includes the formation of a silicon nitride joining interlayer between the joined bodies by heating the joined assembly in a nitrogen atmosphere consisting of a ceramic, ceramic or metallic body, and an Al—Si joining interlayer. By heating above approximately 1100° C. up to 1450° C. in high-purity nitrogen for at least 5 minutes and up to several hours, the Al reacts to form aluminum nitride and the silicon reacts to form silicon nitride. Using this method, the melting point of the joining interlayer is significantly increased by a simple post-joining thermal treatment in a controlled atmosphere. The system of this invention may be used with monolithic components or composites such as those including fiber in their structure.

Shear strength testing on the joints of silicon carbide assemblies fabricated in accordance with the present invention demonstrated shear strengths in excess of 125 MPa. Joined assemblies were also subjected to temperature cycling tests by cycling the assemblies in air 25× between 20° C. and 350° C. initially, then between 20° C. to 1200° C. Structural analysis of these assemblies using optical and scanning electron microscopy showed no change in braze joint microstructure and no crack formation as a result of thermal cycling. Post cycling shear testing showed no loss of strength. An assembly was also subjected to a water quench test in which it was heated to 700° C. and then quickly transferred to a water quench bath. A crack started to form in the braze layer, but due to the crack-arresting properties of the two-phase joining interlayer, the assembly remained joined macroscopically as opposed to complete debonding. Meeting the 1200° C. temperature threshold for joint integrity is particularly important as that is the temperature stability target for a design basis reactor accident. As shown in FIG. 3, the formation of lower melting point joining structures resembling ligaments 18 contributes to the crack-arresting properties of joining interlayer 16.

Silicon carbide assemblies made in accordance with the present invention were also subjected to irradiation testing in a research nuclear reactor PWR flow loop. Several joined assemblies were irradiated in the typical PWR primary water conditions of 300° C., 1000 ppm B and 7 ppm Li at saturation pressure. These samples remained in the reactor for 6 months and accumulated about 11,200 MWh in that period. Based on typical flux numbers for the facility, this exposure corresponds to about $3.7 \times 10^{20}$ n/cm²-s E>0.1 MeV. Even after this length of time, joint integrity was retained in these samples.

An important aspect of the melting point assisted multiphase diffusion brazing approach embodied by the present invention is that this system provides a controlled neutron expansion material brazing system. Under neutron irradiation, materials typically undergo swelling due to atomic displacements; this swelling causes stresses to build up in the joint. Therefore, systems must be engineered that can accommodate these stresses in-service. The composite joining system of this invention mitigates neutron induced swelling and expansion and the exemplary embodiments described herein include a two-phase system that expands under neutron irradiation in a controlled manner. Thus, this system maintains mechanical integrity under neutron irradiation. Microstructural evaluation performed after joining showed a fully dense microstructure that is likely to be hermetic through the operating pressures experienced in a commercial operating nuclear reactor. With regard to other advantages of this invention, the described joining system does not require extensive heating times or high pressures that may prove difficult and economically impractical for manufacturing of production fuel rod cladding assemblies. This process also allows for the integration of mechanical features, such as threaded joints or pins, which would extend the temperature stability of the full joining solution to beyond design-basis accidents. The joining technology of this invention may also incorporate mechanical interlocks to further increase the safety factor of the fabricated assemblies.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A method for fabricating assemblies, comprising:
   (a) providing a first component, wherein the first component includes ceramic, metal, or composite;
   (b) providing a second component, wherein the second component includes ceramic, metal, or composite;
   (c) positioning a multiphase joining interlayer between the first and second components, wherein the joining interlayer includes:
      (i) a first phase that includes niobium silicide or titanium silicide and that melts at a first temperature, and
      (ii) a second phase interspersed throughout the first phase, and wherein the second phase melts at a second temperature that is lower than the melting temperature of the first phase; and
   (d) heating the joining interlayer to a temperature in the range of 725° C. to 1450° C. for a predetermined period of time, wherein heating the joining interlayer to a temperature in the range of 725° C. to 1450° C. for a predetermined period of time softens the first phase and melts the second phase, wherein the first phase remains in a solid or a semi-solid state, and wherein the second phase segregates to the boundaries of the first phase and transforms the joining interlayer into a substantially porosity-free adherent material that joins the first component to the second component.

2. The method of claim 1, wherein the first component is a silicon carbide ceramic-matrix composite.

3. The method of claim 1, wherein the second component is a silicon carbide ceramic-matrix composite.

4. The method of claim 1, wherein the first phase of the multiphase joining interlayer includes silicon and the second phase of the multiphase joining interlayer includes aluminum.

5. The method of claim 1, wherein the substantially porosity-free adherent material includes silicon nitride.

6. The method of claim 5, wherein the silicon nitride is formed by heating the multiphase joining interlayer to a temperature in the range of about 1100° C. to 1450° C. in high-purity nitrogen for a period of at least five minutes to several hours.

7. The method of claim 1, wherein the transformed joining interlayer has a shear strength in excess of 125 MPa.

8. A method for fabricating assemblies, comprising:
(a) providing a first component, wherein the first component includes ceramic, metal, or composite;
(b) providing a second component, wherein the second component includes ceramic, metal, or composite;
(c) positioning a multiphase joining interlayer between the first and second components, wherein the multiphase joining interlayer includes three distinct layers, wherein the first and third layers are multiphase Al-80 wt % Si alloys and the second layer, which is sandwiched between the first and third layers, is a metal selected from the group consisting of titanium, zirconium, molybdenum, niobium, and combinations thereof, and wherein the first and third layers each include a first phase that melts at a first temperature and a second phase interspersed throughout the first phase, and wherein the second phase melts at a second temperature that is lower than the melting temperature of the first phase; and
(d) heating the joining interlayer to a temperature in the range of 725° C. to 1450° C. for a predetermined period of time, wherein heating the joining interlayer to a temperature in the range of 725° C. to 1450° C. for a predetermined period of time softens the first phase and melts the second phase, wherein the first phase remains in a solid or a semi-solid state, and wherein the second phase segregates to the boundaries of the first phase to form a substantially porosity-free adherent material.

9. A method for fabricating assemblies for use in nuclear reactors, comprising:
(a) providing a first silicon carbide component;
(b) providing a second silicon carbide component;
(c) positioning a multiphase joining interlayer between the first and second components, wherein the multiphase joining interlayer includes three distinct layers, wherein the first and third layers are multiphase Al-80 wt % Si alloys and the second layer, which is sandwiched between the first and third layers, is a metal selected from the group consisting of titanium, zirconium, molybdenum, niobium, and combinations thereof, and wherein the first and third layers each include a first phase that melts at a first temperature and a second phase interspersed throughout the first phase, and wherein the second phase melts at a second temperature that is lower than the melting temperature of the first phase; and
(d) heating the joining interlayer to a temperature in the range of 725° C. to 1450° C. for a predetermined period of time, wherein heating the joining interlayer to a temperature in the range of 725° C. to 1450° C. for a predetermined period of time softens the first phase and melts the second phase, wherein the first phase remains in a solid or a semi-solid state, and wherein the second phase segregates to the boundaries of the first phase to form a substantially porosity-free adherent material.

10. The method of claim 9, wherein the substantially porosity-free adherent material includes silicon nitride that is formed by heating the multiphase joining interlayer to a temperature in the range of about 1100° C. to 1450° C. in high-purity nitrogen for a period of at least five minutes to several hours.

11. The method of claim 9, wherein the first and third layers are hypereutectic Al-80 wt % Si alloys.

* * * * *